Figure 1:
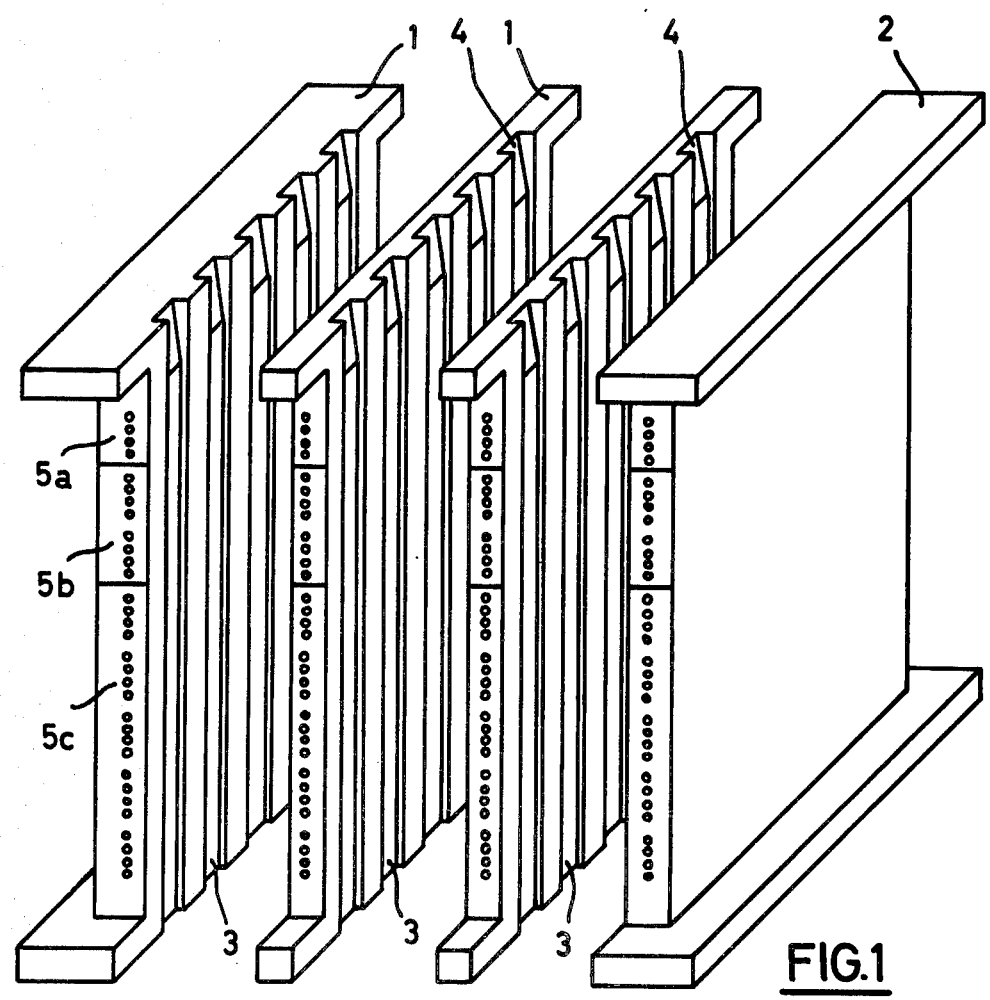

United States Patent [19]

Fink et al.

[11] 4,153,501

[45] May 8, 1979

[54] PROCESS AND APPARATUS FOR REMOVING VAPORIZABLE CONSTITUENTS FROM VISCOUS SOLUTIONS OR MELTS OF THERMOPLASTICS

[75] Inventors: Peter Fink, Speyer; Hans Wild, Frankenthal; Johann Zizlsperger, Schriesheim; Rudi W. Reffert, Beindersheim; Gunter Thielen, Ludwigshafen, all of Fed. Rep. of Germany

[73] Assignee: BASF Aktiengesellschaft, Fed. Rep. of Germany

[21] Appl. No.: 768,636

[22] Filed: Feb. 14, 1977

[30] Foreign Application Priority Data

Feb. 19, 1976 [DE] Fed. Rep. of Germany ....... 2606612

[51] Int. Cl.² .............................................. B01D 1/22
[52] U.S. Cl. ...................... 159/49; 159/2 R; 159/13 R; 159/13 A; 159/27 D; 159/DIG. 10; 528/501
[58] Field of Search ...................... 159/13 R, 13 A, 49, 159/DIG. 10, 27 D, 2 R; 520/501

[56] References Cited

U.S. PATENT DOCUMENTS

| | | | |
|---|---|---|---|
| 2,853,127 | 9/1958 | Sessen | 159/2 R |
| 3,453,184 | 7/1969 | Gemassmer et al. | 159/DIG. 10 |
| 3,853,672 | 12/1974 | Gordon et al. | 159/DIG. 10 |
| 3,966,538 | 6/1976 | Hagberg | 159/DIG. 10 |

Primary Examiner—Norman Yudkoff
Attorney, Agent, or Firm—Keil & Witherspoon

[57] ABSTRACT

A process for removing vaporizable constituents from high-viscosity solutions or melts of thermoplastics by continuous evaporation along a heated devolatilization zone and separation of the vapor phase from the liquid phase in a downstream separating vessel. The plastic solution or melt is first heated stepwise in increments, in the devolatilization zone, whilst the product is in the form of thin layers from about 0.5 to 4 mm, so as to maintain a temperature difference of less than 50° C. between the heat transfer medium and the plastic solution or melt until the devolatilization temperature is reached, the distribution of the solution or melt to form thin layers of product taking place whilst the temperature conditions still correspond to those of the feed of solution or melt, after which the vaporizable constituents are evaporated so as to form a two-phase system of vapor and melt, and the heat of evaporation absorbed is substantially returned to the product during the evaporation along the devolatilization zone. The process permits the removal of vaporizable constituents under mild conditions.

5 Claims, 8 Drawing Figures

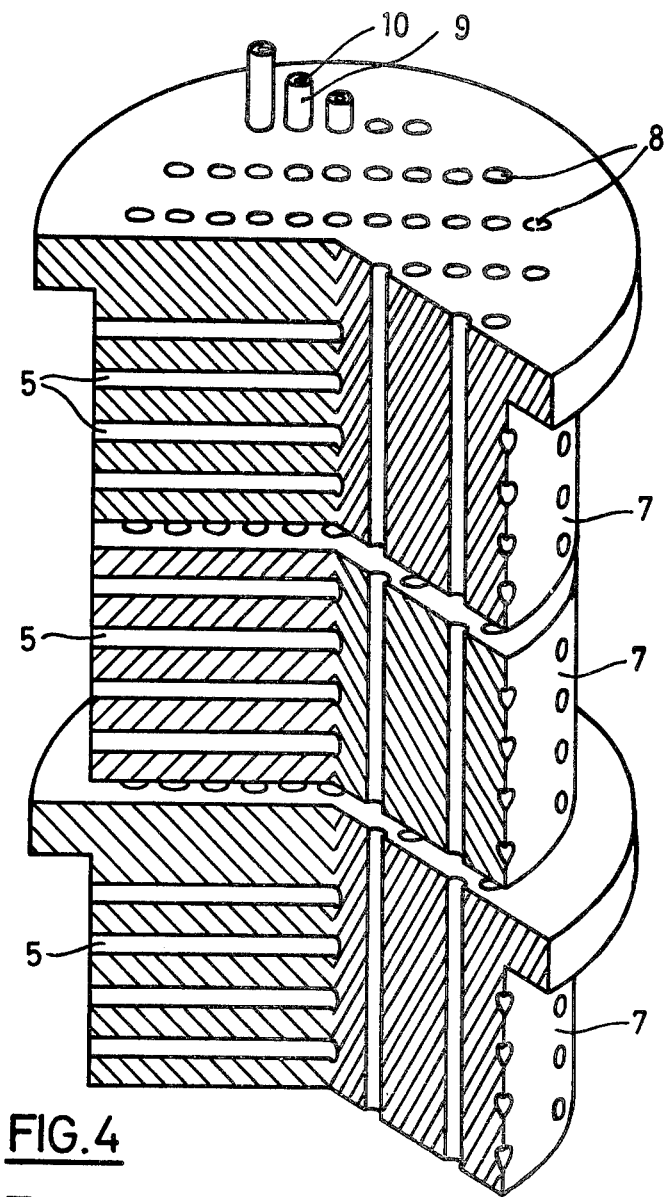
FIG.4
FIG.5
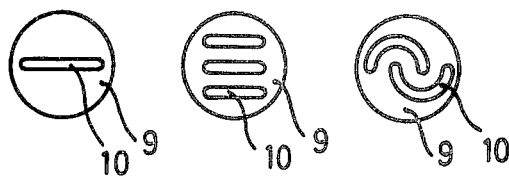

PROCESS AND APPARATUS FOR REMOVING VAPORIZABLE CONSTITUENTS FROM VISCOUS SOLUTIONS OR MELTS OF THERMOPLASTICS

The present invention relates to a process and apparatus for removing vaporizable constituents from high-viscosity solutions or melts of thermoplastics by continuous evaporation along a heated devolatilization zone.

In the manufacture of thermoplastics by polymerizing monomers or monomer mixtures in mass or in solution, the polymers obtained are usually in the form of a solution in the monomeric starting materials, in solvents or in a mixture of monomers and solvent. To isolate the polymers it is therefore necessary to remove the volatile constituents from the reaction mixture by evaporation, whilst supplying heat, under atmospheric or reduced pressure.

Numerous processes and apparatuses for removing the vaporizable constituents from such viscous plastic solutions or melts have already been proposed. Thus, vaporizing kneaders and extruders, tubular evaporators, flash evaporators, flash evaporators and suitable combinations of these have been disclosed and are more or less suitable for use with a plurality of thermoplastics.

It is, in particular, heat-sensitive thermoplastics or mixtures of thermoplastics, eg. styrene polymers and $\alpha$-methylstyrene polymers, including the copolymers and terpolymers of styrene and/or $\alpha$-methylstyrene with acrylonitrile and/or methacrylonitrile, which easily suffer degradation if unsuitable processes and apparatuses are used to remove the solvent and unconverted monomer and if the heating of the viscous plastic solutions or melts is not carried out sufficiently gently. Thus, after-polymerization and thermal degradation may result in, for example, discoloration, decomposition products and oligomers, which are undesirable. If the solutions contain graft rubbers, which improve the impact strength, subsequent cross-linking or degradation may occur during devolatilization, and these phenomena may also have an adverse effect on the properties of the product.

Processes intended to avoid these disadvantages have been disclosed. However, for certain purposes they can only be used with limitations, if at all. Furthermore, they only partially achieve the desired effect of gently heating the heat-sensitive solutions or melts.

Thus, it has already been proposed to supply the required heat of evaporation through tubular heat exchangers, with the high-viscosity solution or melt of the thermoplastic flowing through the tubes which are externally heated by means of a suitable heat carrier. In this process, evaporation of the volatile constituents results in a two-phase mixture comprising a melt of the polymer and vapor bubbles of the volatile phase. The separation of this mixture into a liquid phase and a vapor phase takes place in a downstream separating vessel which is preferably kept under reduced pressure. Special embodiments of appropriate processes and apparatus are disclosed, for example, in British Pat. No. 997,838, German Published Application DAS 1,231,898 and German Laid-Open Application DOS 1,595,199.

The conventional heat exchangers employed for these processes are in general operated with relatively high termperature differences between the heating medium and the high-viscosity plastic solution or melt. This one-step process can be employed advantageously for certain polymer solutions whilst in the case of others it suffers from severe disadvantages. Thus, an undesirable after-polymerization may take place which can, especially in the case of a copolymerization, lead to undesirable changes in the product composition. In particular, however, these processes cannot be used to remove vaporizable constituents from high-viscosity solutions or melts of heat-sensitive plastics so as to avoid, to the desired degree, damage to the product; instead, decomposition products and oligomers form after only a short time.

Attempts have been made to overcome this disadvantage by effecting the removal of volatile constituents in two stages when working up the solutions obtained by copolymerizing styrene with acrylonitrile. In this process, described in U.S. Pat. No. 2,941,985, the greater part of the unconverted acrylonitrile is initially evaporated from the polymer solution in a first process stage, at a relatively low temperature. The removal of the remaining volatiles from the polymer is then effected in a second process state at a substantially higher temperature. However, this two-page process has the disadvantage that when manufacturing copolymers having a high acrylonitrile content, difficulties are encountered in removing acrylonitrile, which is very heat-sensitive, to a sufficient degree in the first evaporation stage to ensure that in the second evaporation stage no decomposition products which detract from the appearance of the copolymer can form. This two-stage process has the further disadvantage that given the relatively low devolatilization temperature in the first stage, the partially devolatilized polymer solution cools particularly intensely if relatively large amounts of acrylonitrile have to be evaporated. This cooling can increase the viscosity of the residual solution to a point where it no longer has sufficient flow to be transferable to the second devolatilization stage.

German Laid-Open Application DOS 2,138,176 describes a one-stage process for flash evaporation, which permits continuous or stepwise heating of the heat-sensitive plastic solutions or melts. It is true that this makes it possible substantially to reduce damage to the product during flash evaporation, as compared to other processes, and also to avoid some other disadvantages which have been mentioned. Since, however, the process of German Laid-Open Application DOS 2,138,176 also requires the use of tube-bundle heat exchangers which have to be operated with relatively large temperature differences between the product and the heating medium, this process still causes undesirable yellowing and decomposition of the product — albeit to a lesser degree — during devolatilization.

It is an object of the present invention to provide a process and an apparatus for removing vaporizable constituents from high-viscosity solutions or melts of thermoplastics, which avoid the conventional disadvantages, and by means of which it is possible to effect very extensive removal of the vaporizable constituents in a very simple and gentle manner without causing significant changes in, or damage to, the product.

We have found that this object is achieved, according to the invention, by heating the high-viscosity solutions or melts of the thermoplastics to the devolatilization temperature in the devolatilization zone in a defined and gentle manner, whilst the product is in the form of thin layers, the distribution of the plastic solution or melt into thin layers taking place whilst the material is still under the temperature conditions of the feed solution or melt, and by substantially returning the heat of evaporation to the product in the devolatilization zone, whilst evaporation is taking place.

Accordingly, the present invention relates to a process for removing vaporizable constituents from high-viscosity solutions or melts of thermoplastics by continuous evaporation along a heated devolatilization zone, and separation of the vapor phase from the liquid phase in a downstream separating vessel, wherein the plastic solution or melt is first heated stepwise to the devolatilization temperature by indirect heat exchange, in the devolatilization zone, under a pressure greater than the saturation pressure of the vaporizable constituents at the prevailing temperature, and the vaporizable constituents are then evaporated in the devolatilization zone, under a pressure lower than the saturation pressure of the said constituents at the devolatilization temperature, to form a two-phase system of vapor and melt, whereupon the vapor phase is removed in the downstream separating vessel and the plastic melt, which has been substantially freed from the vaporizable constituents, is discharged. The process is characterized in that the viscous solution or melt of the thermoplastics is heated to the devolatilization temperature whilst the product is in the form of thin layers, the distribution of the solution or melt into thin layers taking place whilst the material is still under the temperature conditions of the feed of solution or melt, the heating of the thin layers is carried out stepwise, in the direction of product flow, in such a way that the temperature difference between the heat transfer medium and the plastic solution or melt is always less than 50° C., and the heat of evaporation absorbed is substantially returned to the product during the evaporation in the devolatilization zone.

Because of the uniform and rapid supply of heat to the solutions or melts of the thermoplastics, and because of the precise temperature control achieved by using small temperature differences between the product and the heat transfer medium both during heating to the devolatilization temperature and during evaporation, and also because of the fact that the amount of heat abstracted by the evaporation is substantially resupplied to the product directly during evaporation in the devolatilization zone, the process of the invention permits partial or almost complete removal of the vaporizable constituents under very gentle conditions. Furthermore, the process is simple to carry out, flexible and of broad applicability.

For the purposes of the present invention, thermoplastics are to be understood as being all macromolecular materials or mixtures of such materials which become plastic and flowable under the action of pressure and heat. The term macromolecular materials here embraces all polymers obtained essentially by homopolymerization or copolymerization, as well as embracing polycondensates and polyaddition products. The mean molecular weight of the thermoplastics, determined as the number-average from measurements of the osmotic pressure, is as a rule in the range of from about 500 to about 1,000,000, preferably from 30,000 to 500,000.

In particular, the process according to the invention may be used for removing vaporizable constituents from solutions or melts of heat-sensitive polymers or polymer mixtures. Examples which may be mentioned are homopolymers of butadiene, isoprene, isobutylene and/or vinyl ethers, and copolymers and terpolymers of these monomers with one another and/or with acrylic esters, methacrylic esters and/or monovinyl-aromatic monomers, eg. styrene or α-methylstyrene. The category also includes the polymers and polymer mixtures which are obtained by polymerizing acrylonitrile or methacrylonitrile or monomer mixtures containing these, eg. styrene-acrylonitrile copolymers or butadiene-acrylonitrile copolymers. It also includes the two-phase polymer mixtures in which the disperse phase consists of homopolymers, copolymers or terpolymers which increase the impact strength and which are mostly grafted products, eg. based on butadiene, isoprene and/or acrylic esters, whilst the coherent phase consists of homopolymers, copolymers or terpolymers of olefinically unsaturated monomers, eg. styrene, α-methylstyrene, acrylonitrile, methacrylonitrile, acrylic or methacrylic esters (especially of alcohols of 1 to 8 carbon atoms), maleic anhydride and the like. The two-phase polymer mixtures are also referred to as SB, ABS and ASA polymers. The process is also applicable, with equal advantage, to, for example, melts or solutions of homopolystyrene or poly-α-methylstyrene.

The thermoplastics are manufactured in accordance with the conventional processes, by reacting the monomers or monomer mixtures, in the presence or absence of initiators which form free radicals, in mass or in solution, and are in general obtained in the form of a solution or melt having a viscosity in the range of from $10^2$ to $10^6$ and expecially from $10^3$ to $10^5$ poise. These viscosity data relate to the temperature and process conditions under which the solution or melt is fed into the devolatilization zone. The solutions or melts of the thermoplastics may contain up to 70% by weight of vaporizable constituents. In particular, these are unconverted residual monomers, with or without solvents or dispersing agents. In general, the content of vaporizable constituents is from 10 to 50% by weight, based on the solution or melt. According to the invention, the process may be used to free the solutions or melts almost completely, or only partially, from vaporizable constituents. Almost complete removal of the vaporizable constituents is intended to mean, in the present context, that the vaporizable constituents are removed as far as possible from the solution or melt, their residual content being in general less than 0.5% by weight, preferably less than 0.1% by weight, based on the melt.

According to the invention, the vaporizable constituents are removed from the solutions or melts of the thermoplastics by continuous evaporation along a heated, preferably vertical or virtually vertical, devolatilization zone. The solution or melt is fed into the devolatilization zone under a pressure which is above the saturation pressure of the vaporizable constituents at the chosen devolatilization temperature. In the devolatilization zone, the solution or melt is first heated, by indirect heat exchange, to the devolatilization temperature, the pressure remaining above the saturation pressure of the vaporizable constituents at the said temperature. After the devolatilization temperature has been reached, the vaporizable constituents are evaporated from the solution or melt of the thermoplastics, along the heated devolatilization zone, under a pressure which is lower than the saturation pressure of the said constituents at the chosen devolatilization temperature. This evaporation along the heated devolatilization zone is brought about by setting the pressure, at the devolatilization zone outlet, to a value below the saturation pressure of the vaporizable constituents at the chosen devolatilization temperature. Preferably, the pressure at the outlet of the devolatilization zone is equal to or below atmospheric pressure; in a particularly advantageous embodiment, it is below atmospheric pressure, for example from about 1 to about 100 mm Hg.

The devolatilization temperature depends above all on the thermoplastic employed. It is in general above the melting point of the said thermoplastic but below the temperature at which the product suffers significant degradation. Advantageously, the devolatilization temperature is kept as low as possible, within the said range, though it should be sufficiently high to ensure that after leaving the devolatilization zone the thermoplastic is still in the form of a melt which has good flow and can be pumped readily. The devolatilization temperatures are in general from 180° to about 350° C. and preferably from 200° to 280° C.

As a result of the evaporation of the vaporizable constituents along the heated devolatilization zone, a two-phase mixture forms in the said zone; it comprises a melt of the thermoplastic, constituting a liquid melt phase, and vapor bubbles of the vaporized constituents, forming the volatile phase. The separation of this two-phase mixture into the vapor phase and the liquid melt phase takes place immediately after the mixture issues from the devolatilization zone, in a separating vessel downstream from the said zone. The vaporized volatile constituents are removed from the separting vessel, advantageously by suction or pumping-off. The melt of the thermoplastics, which has been completely or partially freed from the volatile constituents, is collected in the separating vessel and discharged by means of conventional transport devices, for example gear pumps.

An essential feature of the process of the invention is that the heating of the solution or melt to the devolatilization temperature in the devolatilization zone is effected by indirect heat exchange in a specific and defined manner. For this purpose, the solution or melt of the thermoplastics is, according to the invention, divided into thin layers of product. It is essential that this division of the stream of product into thin layers should take place under the temperature conditions of the feed solution or melt. For this purpose it is necessary that the temperature of the said solution or melt should, in the first temperature stage of the devolatilization zone, be kept virtually at the temperature of the feed solution or melt. This ensures that the heat transfer during the entire heating process takes place rapidly and uniformly in thin layers of the product. An "internal" distribution chamber, in which the solution or melt is divided into several small streams of product when it is already under the heating conditions is, in contrast, difficult to control in respect of temperature, so that relatively large temperature differences may be set up and above all the product cannot be heated in a defined and uniform manner.

The thin layers of the solution or melt flow through the heated devolatilization zone in product-flow zones. These product-flow zones are, for example, in the form of flat channels, set into metal blocks built up of segments and assembled on the unit construction principle, which blocks serve as the heat transfer medium. The blocks can be heated by any desired primary heat carrier. For this purpose, all conventional heating systems can be used, for example steam heating circuits or fluid heating circuits, electrical heating rods and the like. The heat transfer through the blocks permits optimum control because of the good heat conduction by the blocks.

To achieve very gentle heating of the solution or melt to the devolatilization temperature, the heat transfer is effected stepwise, in the devolatilization zone, in several heating zones arranged in series in the direction of product flow. The devolatilization zone is sub-divided into at least two, advantageously into three or more, preferably independent heating zones. The temperature of the metal blocks used for heat transfer in the individual heating zones is regulated, by means of the primary heat carriers, in such a way that the temperature difference between the heat transfer medium and the thin layers of the solution or melt is always less than 50° C., both whilst the product is being heated to the devolatilization temperature and during the evaporation. Preferably, temperature differences of less than 30° C. and in particular less than 20° C. are maintained. In the first heating zone, the temperature of the blocks should virtually correspond to the temperature of the feed of solution or melt. Preferably, the latter is fed into the heated devolatilization zone at the temperature at which it is obtained from its process of manufacture. In general, the feed temperature is from 50° to 200° C.

Advantageously, the thickness of the thin layers of product being heated is from 0.5 to 4 mm, preferably from 0.5 to 3 mm. In this way, rapid and uniform heating over the entire cross-section of the product stream, and hence exact temperature control for small temperature differences, becomes possible even with thermoplastics, though these are, as a rule, poor heat conductors. As a result of the uniform heating over the entire cross-section of the layers of product, uniform flow of the solution or melt is also achieved, and an undesirable residence time distribution in the individual layers is avoided.

The width of the cross-section of the thin layers of product, which is equivalent to saying the width of the cross-section of the product zones in the devolatilization zone, can be varied within wide limits, as can the shape of the cross-section, and can thereby be suited to the particular objects of the invention. Thus it is possible for the cross-section of the product zones in the devolatilization zone to remain constant or, for example, to increase in width in the direction of product flow. The changes can be gradual or abrupt and can extend over the whole, or only over a part, of the product zones. The width of the cross-section of such a zone can also undergo several changes; for example, it can first narrow and then widen. All that is important is that the thickness of the thin layers of product in the zones, in the heated region of the devolatilization zone, should always be less than 4 mm. However, it goes without saying that the shape of all product zones — over the cross-section of the entire product flux, that is to say over the cross-section of the devolatilization zone — should be the same.

By changing the width of the cross-section and hence the cross-sectional area of the product zones, the flow rate and hence the residence time of the highly viscous solution or melt can be altered and can, for example, be regulated to different values in the different heating zones. In particular, this method can be used to decide the pressure in the product zones of the devolatilization zone. Thus it is possible, through the design of the said zones, to decide the value of the pressure therein in such a way that the boiling of the vaporizable volatile constituents in the heated product zones commences at a particular spatially defined position in the devolatilization zone. This can be achieved, for example, by an abrupt increase in the width of the cross-section of the said zones or by a progressive or abrupt narrowing or constriction, followed by a widening, of the said zones in the devolatilization zone. Provided care is taken that as a result of this increase in the cross-sectional width of the product zones the pressure of the solution or melt in the devolatilization zone falls below the saturation pressure of the vaporizable constituents at the temperature prevailing at this particular point, this method precisely fixes the start of evaporation in the devolatilization zone. This has the advantage, inter alia, that the devolatilization temperature can be selected very accurately, and be kept to values ensuring gentle treatment of the product, as a result of the stepwise heating of the solution or melt.

The start of the evaporation in the heated devolatilization zone can furthermore be regulated in the conventional manner for such processes, by regulating the pressure at the devolatilization zone outlet, ie. by regulating the pressure in the downstream separating vessel, taking into account the pressure and temperature conditions of the solution or melt when it is fed into the devolatilization zone.

A further essential and characteristic feature of the process of the invention is that the heat of evaporation absorbed, which is primarily always abstracted from the product to be devolatilized, is substantially returned to the product during the evaporation process along the heated devolatilization zone. This avoids excessive cooling of the plastic melt during evaporation of the vaporizable constituents and makes it possible to carry out the process at low devolatilization temperatures, which are only relatively little above the desired final temperature of the plastic melt which has been entirely or partially freed from the vaporizable constituents. Advantageously, at least sufficient heat is externally returned to the product, during the evaporation along the heated devolatilization zone, that the drop in temperature of the plastic melt, as a result of the devolatilization, is not more than 30° C. and in particular not more than 20° C. This makes it possible, whilst avoiding the high product temperatures at the beginning of the devolatilization which are required in conventional processes, to effect the removal of the vaporizable constituents from the plastic solutions or melts under particularly gentle conditions, so that the process of the invention is in particular suitable for the after-treatment of solutions or melts of heat-sensitive plastics.

The process of the invention is highly flexible and can easily be adapted to suit various requirements. In particular, the continuous evaporation is carried out in the conventional manner and can be elaborated and modified by conventional measures described in the literature, provided the features essential to the process, as described above, are observed and adhered to. In general, the devolatilization is taken to the point that less than 1% by weight, preferably less than 0.1% by weight, based on the plastic melt, of vaporizable constituents remain in the melt.

The process according to the invention is illustrated below in terms of a suitable apparatus, which also forms part of the present invention.

This apparatus for removing the vaporizable constituents from highly viscous solutions or melts of thermoplastics consists essentially of a special, preferably vertical or substantially vertical, heat exchanger which is provided at one end — the upper end in the case of a vertical arrangement — with a distributor cone for the product feed and at its other end — the lower end in the case of a vertical arrangement — is connected to a separating vessel. The upper region of this separating vessel is provided with a vent port for removing the vaporizable volatile constituents, and at its lower end with a discharge orifice for the devolatilized plastic melt. The discharge orifice is connected to a transport device for the plastic melt, for example a pair of gearwheels, an extruder or the like. The separating vessel can be of any desired design, conforming to any of the conventional embodiments.

For the purposes of the invention, the essential part of the apparatus is the special heat exchanger. This heat exchanger is built up of at least two, preferably three or more, solid metal blocks which are assembled on the unit construction principle and which can be dismantled into at least 2, and preferably 3 or more, segments. The blocks are pervaded by parallel, preferably vertical, slit-shaped channels through which the viscous solution or melt passes. Furthermore, cavity-like passages for receiving the primary heat carrier are provided, also parallel to one another, in the blocks, at right angles to the channels. The cavity-like passages of the total heat exchanger should be sub-divisible into at least 2, preferably at least 3, groups at right angles to the direction of the channels. A further essential feature is that it should be possible to dismantle the heat exchanger into segments in such a way that the slit-shaped channels become exposed or replaceable, whilst in the assembled state these segments are coupled in such a way that their joins present no barrier to heat flow.

As a result of being built up of such segments, the apparatus can at any time be opened up along the product channels, and the channels can be cleaned or replaced before reassembly. This is particularly important when processing heat-sensitive plastics, which readily tend to decompose, forming coke-like deposits. Depending on the particular object to be achieved by the process and on the particular process conditions, the surfaces of the channels can also be appropriately aftertreated and finished. In those embodiments of the apparatus in which it can be dismantled into segments in such a way that the product channels are exposed, the channels can be lined with hollow profiles of a resistant material or readily cleanable material, but the join between the said profiles and channels must not present any barrier to heat flow. The use of replaceable hollow profiles, eg. in the form of throwaway metal sheets, for lining the product channels is in particular advantageous if the decomposition products and deposits resulting from heat-sensitive plastics prove to be difficult to remove by mechanical means or if the solutions or melts to be devolatilized contain aggressive materials.

The slit-shaped product channels of the heat exchanger are so designed that the depth of their cross-section, ie. the direction of minimum dimension of the cross-sectional area, is from 0.5 to 4 mm and especially from 0.5 to 3 mm over the entire length of the channels. Furthermore, the width and shape of cross-section of the channels can be varied extensively, as desired, and may or may not change gradually or abruptly in the direction of flow of the product; for example the channels may widen, or may first narrow and then widen.

The cavity-like passages in the metal blocks, for receiving the primary heat carriers, can be plain bores or can be pipes or pipe coils round which the metal has been cast or presssed. Their construction will, above all, depend on the choice of the primary heat carrier.

Some possible specific embodiments of such a heat exchange apparatus are described below with reference to the accompanying drawings.

FIG. 1 schematically shows the construction of a heat exchanger to be employed according to the invention, in the dismantled condition, the solid metal blocks being plate-shaped. With the exception of the end block (2), the metal blocks (1) are provided on one side with a plurality of open flat slit-shaped channels (3). The channels (3) in any block (1) are parallel to one another and advantageously have a short inlet recess (4) on the feed side. This ensures the uniform distribution of the feed of thermoplastic material to all the channels (3). The inlet recess (4) preferably does not extend as far as the heated zone of the blocks (1). Furthermore, cavity-like passages (5) for receiving the primary heat carrier are set in the plate-shaped metal blocks (1, 2), at right angles to the direction of the channels (3). The passages (5) preferably run parallel to one another and are subdivided into three groups (5a, 5b and 5c), which can be operated at different temperatures.

Figure 2A:
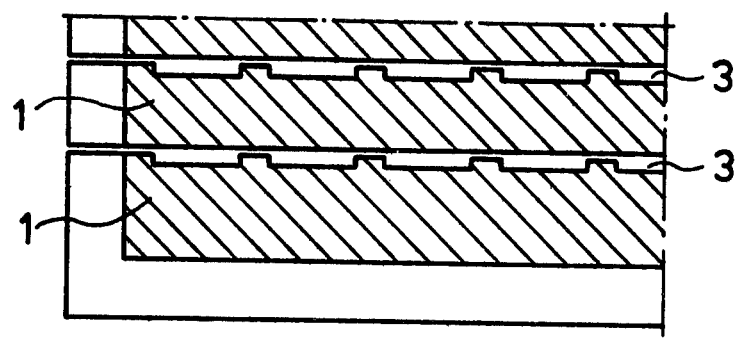
Figure 2B:
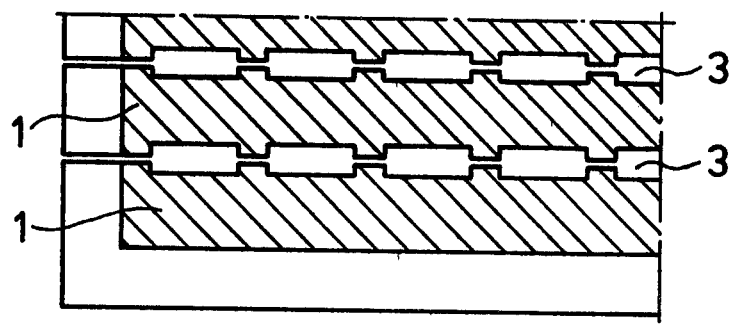

The individual plate-shaped metal blocks (1, 2) are assembled on the unit construction principle in the manner shown in side view in FIG. 1 and in plan view in FIG. 2 and are held together by appropriate means, such as tension bolts and screws, so that the open channels (3) of any block (1) form, with the flat back of the adjacent block (1, 2), sealed leakproof slit-shaped channels through which the product passes. In this way, a heat exchanger built up of blocks is obtained, which after operation can easily be dismantled into the individual blocks (1, 2), so that the channels (3) are exposed and can be cleaned and, where necessary, aftertreated, eg. polished or passivated. Accordingly, in the case of a heat exchanger built up in the above manner from plate-shaped metal blocks, the blocks (1,2) are identical with the previously mentioned segments of the heat exchanger, into which the latter can be dismantled to expose the product channels.

The heat exchanger according to the invention, made up of plate-shaped metal blocks, which is shown schematically in FIG. 1, is very adaptable and can be constructed, or modified, in diverse ways. It is a particular advantage of this apparatus that it is easily adapted, by minor variations, to specific process conditions.

Figure 2C:
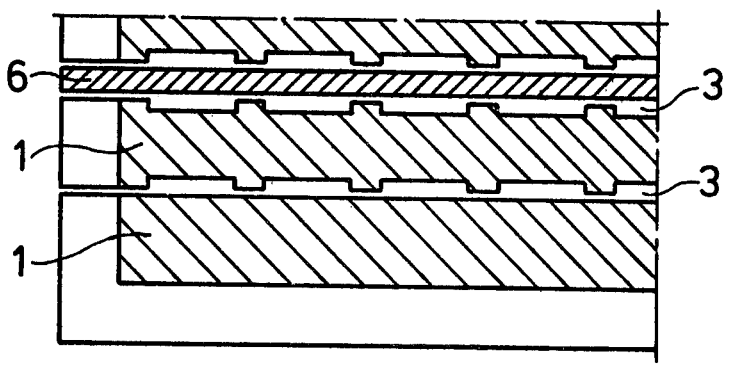

It is of course possible to provide the central plate-shaped metal blocks (1) with open slit-shaped channels (3) on both sides. In that case, the end blocks (2) can also possess slit-shaped channels (3) on its inner face. The blocks (1), which possess product channels (3) on both sides, can be assembled so that the depths of the slits are additive, as is shown in plan view in FIG. 2b. This may be advantageous, for example, if relatively long residence times of the products in the heat exchanger are required. It is also possible, as shown in FIG. 2c, to provide plane-parallel plates (6) between the blocks (1), which bear channels (3) on both sides, when assembling the said blocks. These pates (6) may have been manufactured from the same material as the blocks (1) or from a different material, and may, for example, serve as special gaskets between the individual segments. In addition, it may be advantageous if the inserted plates (6) permit carrying out an additional treatment of the product, eg. if they serve as a source of sonic vibrations or radiation, and/or if they contain measuring elements, eg. transmitters for measuring the pressure and temperature of the stream of product.

Figure 3:
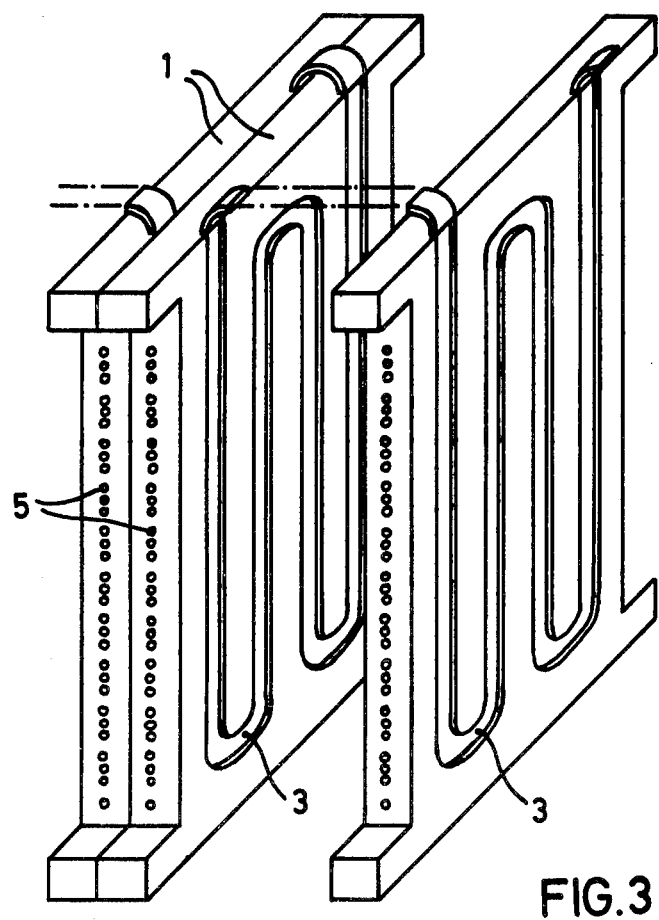

In addition, further arrangements of the product channels (3) are conceivable without departing from the inventive concept herein. One such arrangement is shown, by way of example, in FIG. 3. In this case, the channels (3) in the blocks (1) are joined so that only one stream of product flows through the entire heat exchanger. Given this connection of the channels (3), each individual block (1, 2) can be separately heated. Further possible variations are in respect of the shape and width of the cross-section of the channels (3) in the case of the heat exchange apparatus of the invention, which is built up from blocks (1, 2); these parameters can be varied substantially as desired. Thus, to suit the requirements of a particular process, the channels (3) may, beyond the inlet recess (4), remain of constant cross-section or widen or narrow once or several times, gradually or abruptly. This makes it possible to alter the residence time of the product and in particular to vary the pressure in the heat exchanger. It also makes it possible to select different conditions for the individual heating zones. The channels (3) may be angular or rounded and may, as has already been mentioned, be lined with thin-walled hollow profiles, which may be open or closed, but the join between the profiles and the channels must not present a barrier to heat flow.

FIG. 4 shows, in cross-section, another possible embodiment of a heat exchanger to be used according to the invention. Horizontal, mutually parallel cavity-like passages (5) for receiving the primary heat carrier are set into the individual metal blocks (7). The passages (5) in the individual blocks (7) can be grouped together to form separate zones, so that the individual blocks (7) can be heated to different temperatures. At right angles to the passages (5), the blocks (7) have vertical continuous bores (8). These mutually parallel bores (8) are arranged in the same manner in each individual block (7) so that on superposing the blocks (7), as is the case when assembling the heat exchanger, the vertical bores (8) of the individual blocks (7) are precisely above one another and as a result the bores (8) of the assembled heat exchanger pervade the entire length of the latter. In the assembled condition, the blocks (7) are held together by suitable means, such as tension bolts or tension screws. When assembling the individual blocks (7), it may be useful to provide thin interlayers of heat-insulating materials so as to ensure heat insulation between the various blocks (7), which can be set to different temperature conditions.

Metal rods (9) which contain a hollow profile and do not constitute a barrier to heat flow are provided in the bores (8) of the assembled blocks (7). Since the solution or melt to be devolatilized passes through the rods (9) containing hollow profiles, the said profiles (10) are accordingly in the form of slit-shaped channels. One rod (9) may contain one or more of the slit-shaped hollow profile channels (10), the shape of which is substantially optional, though the depth of the slits is preferably from 0.5 to 4 mm. FIG. 5 shows, in plan view, possible embodiments of the rods (9) containing hollow profiles. In order to clean the product channels, the rods (9) containing the hollow profiles can easily be forced out of the bores (8) of the blocks (7) and replaced by new rods. In this case, therefore, the previously mentioned segments, into which the heat exchanger can, according to the invention, be dismantled, are the rods (9), containing hollow profiles, on the one hand, and the blocks (7), on the other.

Since the rods (9) containing hollow profiles are replaced when soiled and are thus disposable components, they are as a rule manufactured from a very cheap metal, eg. from aluminum alloy. Preferably, soft, readily deformable materials are employed, which can easily be forced into the bores (8) of the blocks (7) in such a way as not to constitute a barrier to heat flow. The rods (9) may themselves be manufactured by conventional processes, eg. by extrusion.

Figure 6:
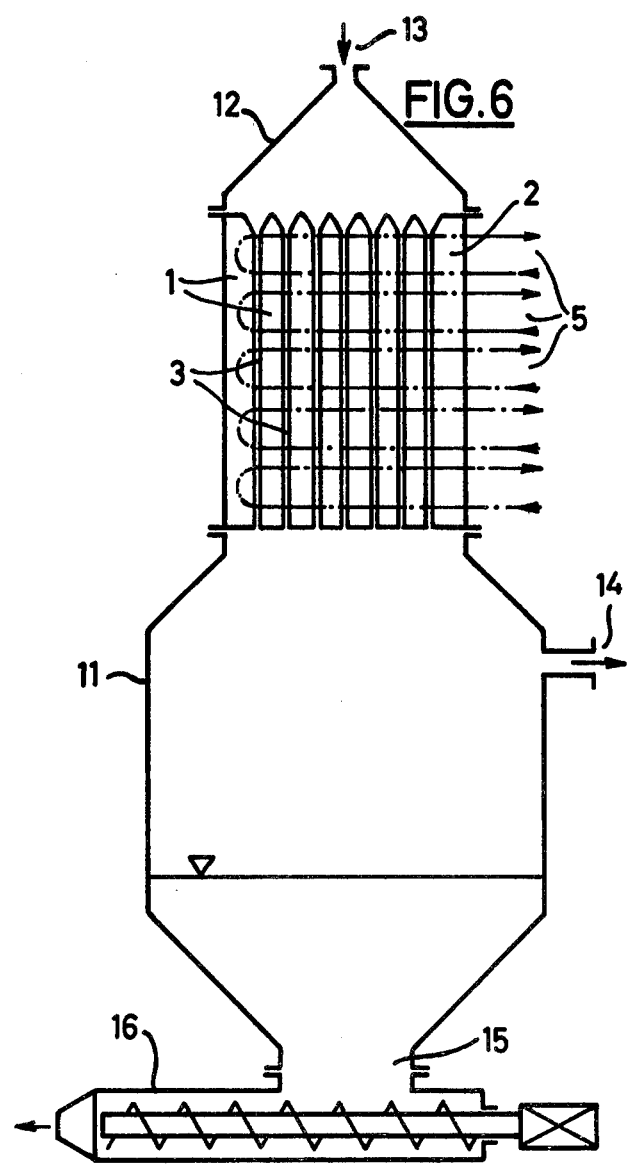

FIG. 6 schematically shows a possible embodiment of the entire devolatilization apparatus. A vertical heat exchanger, for example of the type shown in FIGS. 1 and 2, built up of plate-shaped metal blocks (1, 2) possessing slit-shaped channels (3) through which the product passes, and pipelines (5) through which the heating medium passes, the blocks being assembled on the unit construction principle, is flanged onto a separating vessel (11) and is provided, on the product feed side, with a distributor cone (12). The viscous plastic solution or melt flows through the orifice (13) into the distributor cone (12), where it is uniformly distributed over the channels (3) of the heat exchanger, before the actual heating takes place. The two-phase mixture which forms in the heat exchanger then issues from the channels (3) and enters the separating vessel (11), from which the vaporizable constituents of the plastic solution or melt, which have entered the vapor space, are pumped out through the vent port (14), preferably by application of reduced pressure. The plastic melt, which has been entirely or partially freed from vaporizable constituents, collects at the bottom of the vessel (11), from where it is discharged from the devolatilization apparatus through the discharge orifice (15), by means of a gear pump (16).

The process of the invention, and the apparatus of the invention, have many advantages over conventional processes and apparatuses for removing vaporizable constituents from high-viscosity solution or melts of thermoplastics by continuous evaporation along a heated devolatilization zone. Thus, the rapid and uniform heating of the solution or melt of the thermoplastic permits the removal of the vaporizable constituents under gentle and controlled conditions, as a result of which the plastics can, without excessive exposure to heat and without damage to the product, be brought to a state which permits appropriate further treatment, or after-treatment, of the products on conventional apparatus or machinery. Furthermore, because of their flexibility and variability, the process and apparatus of the invention permit optimum adaptation to the downstream conventional apparatus or machinery used for the further treatment or after-treatment of the products.

In the Example, percentages are by weight.

EXAMPLE

A devolatilization installation as shown in FIG. 6 is equipped with a heat exchanger according to the invention, as shown in FIG. 1. The plate stack consists of 13 plates of aluminum alloy, each being 4 cm thick, 48 cm wide and 110 cm high and each being provided with 5 heating needles made from steel tubing of 1.2 cm internal diameter, as shown schematically in FIG. 6. 12 of the plates are each provided with 9 open channels, 0.2 cm deep, 2 cm wide and 110 cm long, at right angles to the heating needles. The last 5 cm of all the channels are machined out at one end so as to increase gradually from 0.2 cm to 0.8 cm in depth, and constitute the product inlet. The 13th plate is the end plate of the stack and does not possess any channels.

Each heating needle is connected, on the inlet and outlet side, to the identical needles of the other plates by means of a manifold, so as to give 5 heating zones which can each be heated separately.

The plate stack is provided at the inlet with a cone for the product feed and is tightly flanged at the outlet onto a collecting chamber from which the vaporized solvents and monomers can be removed by application of reduced pressure, whilst at the bottom of the chamber the viscous plastic melt can be removed by means of a gear pump.

To carry out the process of the invention, the 5 layers of heating needles of the plate stack are respectively (in the direction of product flow) charged with heat transfer fluid at 145° C., 185° C., 225° C. and, in the case of both the last layers, 260° C.

193 kg per hour of a styrene/acrylonitrile copolymer solution, containing about 55% of the copolymer, are withdrawn at 145° C. from a continuous polymerization zone and fed, under a pressure of 25 atmospheres, to the distributor cone (12) of the apparatus. The vaporized volatile constituents of the solution consist of 36% of ethylbenzene, 48% of styrene and 16% of acrylonitrile and are taken off at the vent port (14), by applying a constant reduced pressure of 18 mm Hg, and are recovered in downstream condensation units.

The solid product issues as a foam, at 246° C., from the slits (3) through which the product has passed, and melts at the bottom of the collecting vessel (11). 106 kg per hour of copolymer melt are discharged by means of the gear pump.

Test specimens produced from this material by injection molding exhibit extremely little yellowing and virtually no dark specks of dirt.

Continuous gas-chromatographic determination of the residual contents of solvents gives values of 0.04 – 0.06% for styrene and ethylbenzene, whilst only traces of acrylonitrile are detected. The same samples show softening points of from 107.3° C. to 108° C. (measured by the Vicat/B method, in accordance with DIN 53,460).

We claim:

1. In a process for removing vaporizable constituents from high-viscosity solutions or melts of thermoplastics by continuous evaporation along a heated devolatilization zone and separation of the vapor phase and the liquid phase in a downstream separating vessel, wherein the plastic solution or melt is first heated stepwise in increments to the devolatilization temperature by indirect heat exchange in the devolatilization zone under a pressure greater than the saturation pressure of the vaporizable constituents at the prevailing temperature, and the vaporizable constituents are then evaporated in the devolatilization zone under a pressure lower than the saturation pressure of the said constituents at the devolatilization temperature to form a two-phase system of vapor and melt, whereupon the vapor phase is removed in the downstream separating vessel and the plastic melt, which has been substantially freed from the vaporizable constituents, is discharged, the improvement which comprises:

forming the plastic solution or melt into a plurality of thin layers having a thickness of from about 0.5 to 4 mm at the temperature of said feed solution or melt;

heating the thin layers of solution or melt to the devolatization temperature by causing said thin layers to flow through the heated devolatization zone in product flow zones, said devolatization zone being heated by a transfer medium in a stepwise manner in the direction of product flow and containing at least two independent heating zones;

controlling the temperature throughout the devolatization zone such that the temperature difference between the heat transfer medium in the independent heating zones and the thin layers is always less than 50° C.; and substantially returning to the thin layer of solution or melt through the heated devolatization zone the heat of evaporation which is abstracted from said thin layer of evaporation of vaporizable components contained therein, whereby the drop in temperature of said thin layer due to evaporation of the vaporizable components is not more than 30° C.; and whereby vaporizable components are removed without exposing the product to excessive heat and without causing damage to the product.

2. The process of claim 1, wherein the temperature of the plastic melt does not fall by more than 30° C. during the evaporation.

3. The process of claim 1, in which the temperature difference between the heat transfer medium and the solution or melt in the devolatilization zone is always less than 30° C.

4. The process of claim 1, in which the thin layers of product which are heated are from 0.5 to 3 mm thick.

5. The process of claim 1, in which the vaporizable constituents are removed to a degree such that their residual content is less than 1 per cent by weight and preferably less than 0.1 per cent by weight.

* * * * *